US010323448B2

(12) United States Patent
Koette et al.

(10) Patent No.: US 10,323,448 B2
(45) Date of Patent: Jun. 18, 2019

(54) DEVICE COMPRISING A PANE AND AT LEAST ONE LIFTING RAIL, METHOD FOR ITS PRODUCTION AND ITS USE

(71) Applicant: SAINT-GOBAIN GLASS FRANCE, Courbevoie (FR)

(72) Inventors: Rolf Koette, Alsdorf (DE); Dieter Kleyer, Wuerselen (DE); Heinrich Lasiota, Stolberg (DE); Elke Wittig, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/740,977

(22) PCT Filed: Oct. 28, 2016

(86) PCT No.: PCT/EP2016/076020
§ 371 (c)(1),
(2) Date: Mar. 29, 2018

(87) PCT Pub. No.: WO2017/097495
PCT Pub. Date: Jun. 15, 2017

(65) Prior Publication Data
US 2018/0202209 A1 Jul. 19, 2018

(30) Foreign Application Priority Data
Dec. 8, 2015 (EP) .................................... 15198337

(51) Int. Cl.
*B60J 1/16* (2006.01)
*E05D 15/24* (2006.01)
*E05F 11/38* (2006.01)

(52) U.S. Cl.
CPC ............ *E05D 15/24* (2013.01); *E05F 11/385* (2013.01); *E05Y 2201/64* (2013.01);
(Continued)

(58) Field of Classification Search
CPC .. E05D 15/24; E05F 11/385; E05Y 2600/456; E05Y 2600/526; E05Y 2201/64; E05Y 2900/20; E05Y 2900/55
(Continued)

(56) References Cited

U.S. PATENT DOCUMENTS 4,026,088 A * 5/1977 Akabane ............... E05F 11/385 49/351
4,987,699 A * 1/1991 Gold .......................... B60J 1/17 156/107

(Continued)

FOREIGN PATENT DOCUMENTS

CA 2314797 A1 * 4/2001 ............ E05F 11/385
DE 3624118 A1 * 1/1988 ................ B60J 1/17

(Continued)

OTHER PUBLICATIONS

International Search Report for International Application No. PCT/EP2016/076020 filed Oct. 28, 2016 on behalf of Saint-Gobain Glass France. dated Feb. 3, 2017. 6 pages. (German + English Translation).

(Continued)

*Primary Examiner* — Jerry E Redman
(74) *Attorney, Agent, or Firm* — Steinfl + Bruno, LLP

(57) ABSTRACT

A device comprising a lifting rail that is firmly adhesively bonded to a pane is presented. The lifting rail has a tuning-fork-shaped vertical section that comprises an enclosing region having two mutually opposite open ends configured to bilaterally enclose an edge of the pane, and therefore fix the plane. The device also includes a stem surface, a region of bifurcation where the stem surface transitions into enclosing region, and an outer edge having a through-hole or a cutout. Also included is an adhesive strip that partially covers the stem surface in a manner that the through-hole or the cutout remain exposed. The adhesive strip also covers
(Continued)

the enclosing region and the two mutually opposite open ends. The adhesive strip is deformed by the edge of the pane in two mutually opposite regions of the adhesive strip.

9 Claims, 6 Drawing Sheets

(52) U.S. Cl.
CPC ... *E05Y 2600/456* (2013.01); *E05Y 2600/526* (2013.01); *E05Y 2900/20* (2013.01); *E05Y 2900/55* (2013.01)

(58) Field of Classification Search
USPC .......................................... 49/374, 375, 506
See application file for complete search history.

(56) References Cited

U.S. PATENT DOCUMENTS

| | | | | |
|---|---|---|---|---|
| 5,765,310 | A * | 6/1998 | Gold | B60J 1/17 49/375 |
| 2003/0093960 | A1 * | 5/2003 | Mizusawa | E05F 11/385 52/204.62 |

FOREIGN PATENT DOCUMENTS

| | | | | |
|---|---|---|---|---|
| DE | 4336107 | A1 * | 4/1995 | B60J 1/17 |
| EP | 0173091 | A2 * | 3/1986 | B60J 1/17 |
| EP | 1936087 | A1 | 6/2008 | |
| EP | 1936088 | A1 | 6/2008 | |
| JP | 2001152740 | A * | 6/2001 | E05F 11/385 |

OTHER PUBLICATIONS

Written Opinion for PCT/EP2016/076020 filed on Oct. 28, 2018 on behalf of Saint-Gobain Glass France. dated Feb. 3, 2017. 11 pages. (English translation + German original).

* cited by examiner (PRIOR ART)

(PRIOR ART)

DEVICE COMPRISING A PANE AND AT LEAST ONE LIFTING RAIL, METHOD FOR ITS PRODUCTION AND ITS USE

CROSS REFERENCE TO RELATED APPLICATIONS

The present application is the U.S. National Stage of International Patent Application No. PCT/EP2016/076020 filed on Oct. 28, 2016 which, in turn, claims priority to European Patent Application No. 15198337.6 filed on Dec. 8, 2015.

The present invention relates to a device comprising a pane and at least one lifting rail.

The present invention also relates to a method for producing the device.

Furthermore, the present invention relates to the use of the device.

Devices comprising transparent panes and lifting rails as well as methods for their production are known. The lifting rails are flat molded parts that are—viewed in vertical section—fork-shaped. The fork-shaped part with its—viewed in the vertical section—tines thus forms a region that can bilaterally enclose the edges of transparent panes. The edges of the transparent panes are inserted into the interior of this region and firmly adhesively bonded on the bottom of the region as well as, optionally, areally on both sides.

During this operation, it can happen that the uncured adhesive pressed out by the edge of the transparent pane from the two lower, still open regions of the enclosing region of the lifting rail, is caught, and is also cured.

Depending on the use of the device, it may be that no space is provided for the pressed-out mass of adhesive in the functional structure involved, such that it can, undesirably, make contact with other parts of the structure. This can be the case in particular if the functional structure is used as a movable side window in automobile doors. However, it can also detach during the service life of the structure and cause undesirable noise. Moreover, it can, in particular, block openings through which water penetrating into the structure can drain. If the drains are plugged, this can, over time, result in corrosion damage.

A further disadvantage of the formation of pressed-out adhesive masses is the higher consumption of adhesive.

In order to remedy the above described disadvantages after the fact, the pressed-out mass of adhesive can be removed mechanically before, during, or after the curing of the adhesive. This can be happen using suitable devices or manually. Meanwhile, the further disadvantage of an additional process step is encountered. Moreover, the adhesive residues removed are unusable waste that must be discarded.

Known from European patent application EP 1 936 088 A1 is a frameless window that comprises a transparent pane, the lower edge of which is fixed in a slot of one or a plurality of holders with at least one layer of an adhesive, wherein the lower edge of the pane is joined to the walls of the slot of the holders by means of one or a plurality of layers of a first adhesive that is applied near the lateral end of the slot, wherein at least one layer of a second adhesive is applied in the slot between the layers of the first adhesive. The method is thus complicated and does not offer a full guarantee against the outflow of adhesives.

Known from European patent application EP 1 936 087 A1 is a frameless window that comprises a transparent pane, the lower edge of which is fixed in a slot of one or a plurality of holders with at least one layer of an adhesive, wherein the adhesive has a modulus of elasticity between 10 and 90 MPa at room temperature, and that the width of the slot of at least one holder is at least twice the thickness of the pane. It is, however, necessary to introduce one or a plurality of closing members to the mounting for the lower edge of the pane in the slit of a holder to prevent leakage of the adhesive.

In contrast, the object of the present invention is to provide a method for producing a device comprising a transparent pane and at least one lifting rail firmly adhesively bonded thereto, that delivers, in a simple manner, devices that are free of pressed-out adhesive.

These and other objects are accomplished according to the proposal of the invention by the device and the method with the features of the independent claims. Advantageous embodiments of the invention result from the features of the subclaims.

The lifting rail serves to connect a pane to a drive device, for example, a traction device or a lifting device, with which the transparent pane is moved horizontally or vertically.

As is known, the lifting rail is a substantially flat component that is preferably constructed from a technical plastic, in particular a thermoplastic, such as polyethylene, polypropylene, polystyrene, polyoxymethylene, polycarbonate, polymethylmethacrylate, polyamide, polyester, in particular polybutylene terephthalate (PBT), polyvinyl chloride, polysulfone, polyethersulfone, polyether ketone, and/or mixtures thereof.

The lifting rail has a substantially or exactly square or rectangular outline, wherein the region that does not accommodate the transparent pane can also have, for example, a concavely or convexly rounded or trapezoidal outline.

The dimensions of the lifting rail can vary widely and are governed by the respective applicational purpose. Preferably, the lifting rail has a height of 3 to 15 cm, a length of 3 to 20 cm, and a thickness of 1 to 5 cm, wherein, in one embodiment, the total thickness in the region that spans the edge of the transparent pane is greater than in the connection region, which connects the lifting rail to a drive device, and, in another embodiment, is the same size.

The vertical section through the lifting rail, in other words, from the outer edge of the connection region to the outer edge of the region that spans the edge of the transparent pane, is fork-shaped, for example, tuning-fork-shaped. This means that the lifting rail has a stem surface, a region of bifurcation where the stem surface transitions into the fork-shaped region, which bilaterally encloses the edge of the transparent pane. However, it is also possible to use a fork shape in which the stem surface transitions smoothly into the fork-shaped region such that the stem surface and the outer surface of the region that bilaterally encloses the edge of the transparent pane form a flat surface.

It is advantageous for the contour in the interior of this region in the region of bifurcation to be adapted to the contour of the edge of the pane.

The stem surface of the lifting rail has at least one, in particular one, through-hole, which is preferably arranged centrally. The through-hole can have various outlines. It can be circular, rectangular, square, triangular, or hexagonal. Preferably, it is circular.

The through-hole is traversed by a bolt that is connected to the drive device, preferably a lifting device or traction device.

In another embodiment, the stem surface of the lifting rail has a cutout on its outer edge, in which the connection to a drive device, for example, a lifting device, engages.

According to the invention, the lifting rail has a single-sided or double-sided, preferably single-sided bonding adhesive strip, which partially covers the stem surface, with the through hole or the cutout remaining exposed. If a double-sided adhesive strip is used, the protective covering on the outside is not removed after application of the adhesive strip on the lifting rail.

The adhesive strip can, in the tuning-fork-shaped configuration, at least partially, preferably completely, cover the region of the bifurcation.

According to the invention, the adhesive strip covers the region bilaterally enclosing the edge of the transparent pane and the mutually opposite open ends of the region. In this configuration, the adhesive strip is deformed by the edge of the pane during the joining of the pane and the lifting rail on the two opposite ends of the enclosing region, in particular in the direction of the stem surface.

In one embodiment of the device according to the invention, the adhesive strip completely encircles the stem surface, the bifurcation region, and the enclosing region.

In another embodiment, the adhesive strip covers the enclosing region such that the regions adjacent the upper edge of the lifting rail remain uncovered.

In another embodiment of the device according to the invention, the adhesive strip is transparent or opaque or transparent in at least one subregion transparent and opaque in at least one other subregion.

Conventional, known adhesive strips, for example, Tesa® Transparent Tape 57405 (glossy) or Scotch Magic Tape® 810 (matte) are used as the adhesive strip to be used according to the invention. A suitable criterion for selecting particularly well-suited adhesive strips is the existence of the conventional, known cataplasma test (7 days at 70°, 100% relative humidity), wherein there must be no disbonding of the adhesive strip from the lifting rail. The adhesive strip must also not tear and/or slide downward in the direction of the stem surface.

Prior to the joining of the pane and the lifting rail, an adhesive is introduced into the interior of the enclosing region. A wide variety of adhesives can be used. Preferably, a polymerization adhesive, a polycondensation adhesive, or a polyaddition adhesive it is used. Preferably, a polyaddition adhesive, in particular a polyurethane adhesive, is used.

During insertion of the pane, the adhesive distributes itself on the bonding surface, with the undesirable outflow of adhesive effectively prevented by the adhesive strip to be used according to the invention.

Then, the adhesive is cured and a stable adhesive bond between the pane and the lifting rail develops.

The pane of the device according to the invention can be made of glass, plastic, wood, metal, or combinations of at least two of these materials.

Preferably, the pane is a transparent pane that is constructed in particular from glass and/or plastic.

In a preferred embodiment of the device according to the invention, the transparent pane is a safety glazing that has at least two transparent panes.

Suitable as the first and, optionally, the second pane are, in principle, all substrates that are thermally and chemically stable as well as dimensionally stable under the conditions of production and use of the transparent pane.

The first pane and/or the second pane preferably contain glass, particularly preferably flat glass, float glass, quartz glass, borosilicate glass, or soda lime glass, or clear plastics, preferably rigid clear plastics, in particular polyethylene, polypropylene, polycarbonate, polymethylmethacrylate, polystyrene, polyamide, polyester, polyvinyl chloride, and/or mixtures thereof. The first pane and/or the second pane are preferably transparent, in particular for the use of the pane as a movable side window of a vehicle or other uses in which high light transmittance is desired. In the context of the invention, "transparent" means a pane that has transmittance in the visible spectral range of >70%. For panes that are not positioned in the traffic-relevant field of vision of the driver, for example, for roof panels, the transmittance can, however, be much lower, for example, >5%.

The thickness of the transparent pane can vary widely and thus be ideally adapted to the requirements of the individual case. Preferably, panes with the standard thicknesses from 1.0 mm to 25 mm, preferably from 1.4 mm to 5 mm are used for vehicle glazing, and preferably from 4 mm to 25 mm for furniture, appliances, and buildings, in particular for electric heaters. The size of the pane can vary widely and is governed by the size of the device according to the invention. The first pane and, optionally, the second pane have, for example, in the automotive industry and the architectural sector usual areas from 200 $cm^2$ up to 20 $m^2$.

The transparent pane can have any three-dimensional shape. Preferably, the three-dimensional shape has no shadow zones such that it can be coated, for example, by cathodic sputtering. Preferably, the substrates are planar or slightly or greatly bent in one or a plurality of spatial directions. In particular, planar substrates are used. The transparent panes can be colorless or colored.

Multiple panes are bonded to one another by at least one intermediate layer. The intermediate layer preferably contains at least one thermostatic plastic, preferably polyvinyl butyral (PVB), ethylene vinyl acetate (EVA), and/or polyethylene terephthalate (PET). However, the thermoplastic intermediate layer can also contain, for example, polyurethane (PU), polypropylene (PP), polyacrylate, polyethylene (PE), polycarbonate (PC), polymethylmethacrylate, polyvinyl chloride, polyacetate resin, casting resins, polyacrylates, fluorinated ethylene propylene copolymers, polyvinyl fluoride, and/or ethylene tetrafluoroethylene copolymers, copolymers or mixtures thereof. The thermoplastic intermediate layer can be formed by one or even by a plurality of thermoplastic films arranged one atop another, with the thickness of the thermoplastic films preferably being from 0.25 mm to 1 mm and typically 0.38 mm or 0.76 mm.

The device according to the invention can be produced using various methods. It is, however, preferably produced using the method according to the invention.

The method according to the invention is characterized by the following process steps: click save (1) Providing at least one lifting rail, having
  a fork-shaped vertical section and
  a stem surface with a through-hole or a cutout on the outer, and
(2) Introducing an adhesive into the interior of the region in the region of bifurcation in an amount that reaches, after insertion of the pane, at most up to the upper edge of the enclosing region on both sides.
(3) Adhesively mounting an adhesive strip on the at least one lifting rail such that it
  partially covers the stem surface, with the through-hole remaining exposed, and
  covers the region bilaterally enclosing the edge of the pane and the mutually opposite open ends of the enclosing region such that the adhesive strip is deformed by the edge of the insertion pane upon insertion in these regions,
(4) Inserting the edge of the pane into the interior of the bilaterally enclosing region, wherein the two mutually opposite regions of the adhesive strip are deformed, and (5) Curing the adhesive.

Using the method according to the invention, the formation of pressed-out plastic masses can be prevented in a simple manner.

The method according to the invention can, however, also be used for producing devices of the prior art, in that the adhesive strip is peeled off. However, this requires an additional process step and there is the risk that parts of cured or uncured adhesive will be torn off.

The device according to the invention, in particular the device according to the invention produced using the method according to the invention can ideally be used as a functional and/or decorative individual piece and/or as a built-in part in furniture, appliances, and buildings, as well as in means of transportation for transportation on land, in the air, or on water, but, in particular in motor vehicles, for example, as a movable rear window and a side window and/or a movable glass roof. Preferably, the device according to the invention is implemented as a vehicle side window or a glass roof.

Of course, the aforementioned features and those described in detail in the following can be used not only in the combinations and configurations indicated, but also in other combinations and configurations or alone without departing from the scope of the present invention.

BRIEF DESCRIPTION OF THE FIGURES

The invention is now explained in detail using exemplary embodiments, with reference to the accompanying figures. They depict, in simplified, not-to-scale representation:

In FIG. 1 through 4*a* the reference characters have the following meaning:

Figures 1, 1A:
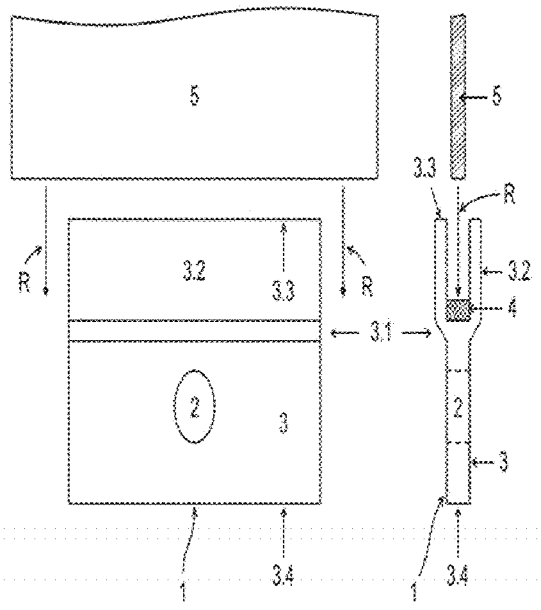
FIG. 1 a side view of a lifting rail 1 with an associated pane 5 before joining to form a device according to the prior art.
FIG. 1*a* a vertical section through the arrangement of FIG. 1.

1 lifting rail with a fork-shaped vertical section
2 through-hole of the lifting rail 1 through the stem surface 3
3 stem surface of the lifting rail 1
3.1 region of bifurcation
3.2 region enclosing the edge of the pane 5
3.3 upper edge
3.4 outer edge
4 adhesive
4.1 pressed-out mass of adhesive
5 pane
6 adhesive strips surrounding the region of bifurcation 3.1
6.1 region of the adhesive strip 6 deformed by the pane 5
7 cutout on the outer edge 3.4
R direction of insertion
R1 direction of deformation
A-B section line

DETAILED DESCRIPTION OF THE FIGURES

FIGS. 1 and 1*a*

FIG. 1 depicts the side view of a detail of a transparent pane 5 and a lifting rail 1 prior to joining in the direction R to form the device 1,5 of the prior art.

Here, and in the following, the transparent pane 5 is a laminated safety glass pane (VSG).

Here, and in the following, the lifting rail 1 is a component made of polypropylene having the length of 8 cm, the height of 6 cm, the thickness of 1 cm in the stem region 3, and the total thickness of 1.5 cm in the region 3.2 (cf. FIG. 1*a*) surrounding the edge of the transparent pane. The lifting rail 1 further has a region of bifurcation 3.1, where the region 3 transitions into the region 3.2.

Centrally arranged in the stem region 3 is a circular through-hole with a diameter of 1.5 cm, which serves to accommodate a bolt for connection to a drive device, for example, a lifting device.

FIG. 1*a* depicts the vertical section through the lifting rail 1 and thus illustrates its tuning-fork-shaped configuration.

A polyurethane adhesive is filled into the interior of the region 3.2. Thus, the lifting rail 1 and the transparent pane 5 are ready for joining.

Figures 2, 2A:
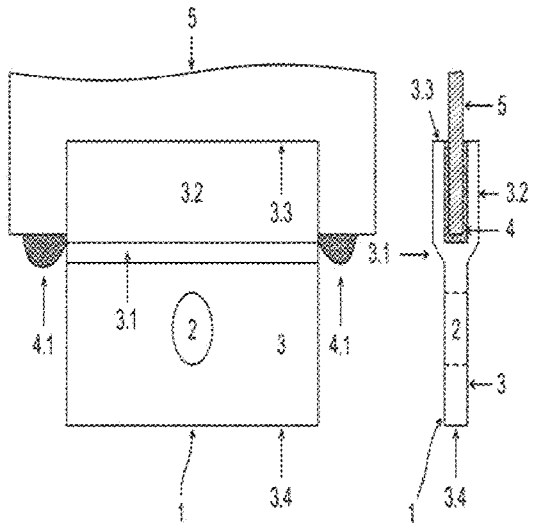
FIG. 2 a side view of the joined device 1,5 according to the prior art with pressed-out adhesive.
FIG. 2*a* a vertical section through the joined device 1,5 according to the prior art.

FIGS. 2 and 2*a*

FIG. 2 depicts a side view of a joined device 1,5 of the prior art comprising a transparent pane 5 and a lifting rail 1.

FIG. 2*a* depicts the vertical section through the device 1,5 of the prior art.

By means of the insertion of the transparent pane 5 into the interior of the enclosing region 3.2, the uncured adhesive 4 is displaced and distributed on the bonding surface. However, in this process, the uncured adhesive 4 is also squeezed out laterally from the region 3.2 and thus forms the undesirable pressed-out adhesive masses 4.1.

Figures 3, 3A:
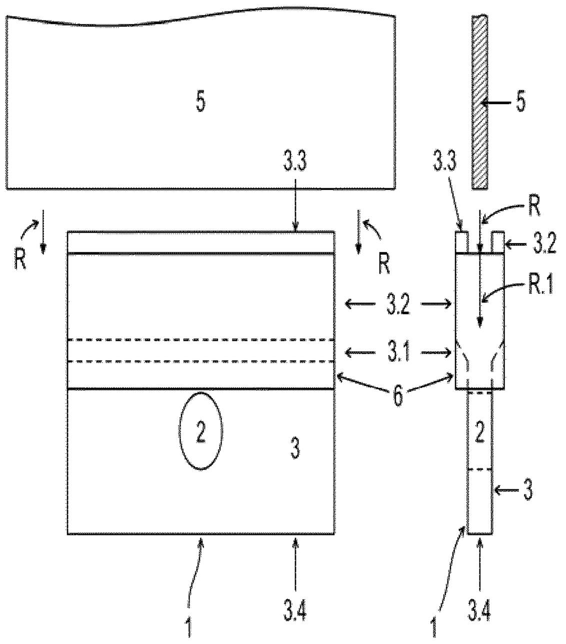
FIG. 3 a side view of a lifting rail 1 with an associated pane 5 prior to joining to form a device 1,5 according to the invention.
FIG. 3*a* plan view of the vertical edge of the lifting rail 1 and of the vertical edge of the associated pane 5.

FIGS. 3 and 3*a*

FIG. 3 depicts a side view of the transparent pane 5 and of the lifting rail 1 prior to joining in the direction R, R1 to form the device 1,5 according to the invention.

FIG. 3*a* depicts the plan view of the lateral vertical end edge of the lifting rail 1 to be used according to the invention.

The lifting rail 1 to be used according to the invention has a circumferentially adhesively mounted adhesive strip 6 (Tesa® Transparent Tape 57405 (glossy)). Here, the stem region 3 is covered such that the through-hole 2 remains exposed. The region of bifurcation 3.1 is completely taped over, whereas, in contrast, the enclosing region 3.2 is covered only to just below the upper edge 3.3.

FIG. 3*a* depicts the manner in which the adhesive strip 6 bridges the opening in the lateral vertical end edge.

The adhesive 4 (not visible) is situated in the interior of the enclosing region 3.2.

Thus, the transparent pane and the lifting rail 1 with the adhesive strip 6 are ready for joining.

Figure 4:
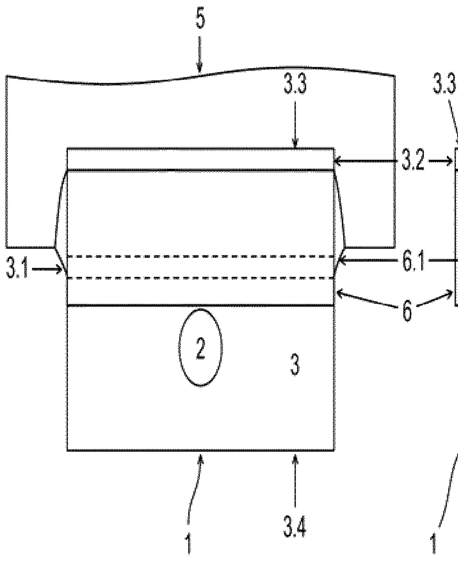
FIG. 4 a side view of the joined device 1,5 according to the invention.
Figure 4A:
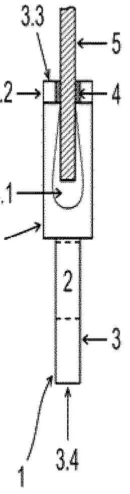
FIG. 4*a* plan view of the vertical edge of the lifting rail 1 and of the vertical edge of the associated pane 5 of the device 1,5 according to the invention.

FIGS. 4 and 4*a*

FIG. 4 depicts the side view of the joined device 1,5 according to the invention with the two regions 6.1 of the adhesive strip 6 deformed by the edge of the transparent pane 5. This configuration is illustrated again by FIG. 4*a*, which offers a view of the lateral vertical end edges of the device 1, 5 according to the invention.

Figure 5:
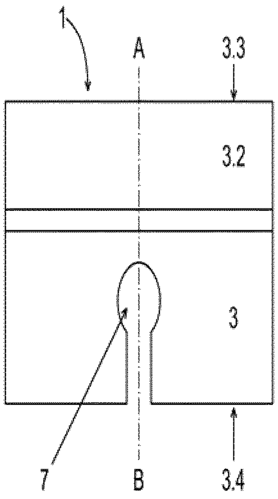
FIG. 5 a side view of the lifting rail 1 with a cutout 7.
Figure 5A:
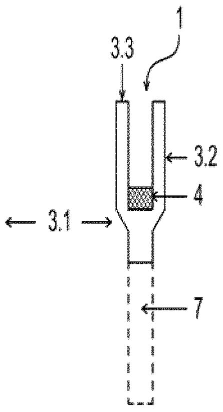
FIG. 5*a* a vertical section through the lifting rail 1 along the section line A-B.

FIGS. 5 and 5*a*

FIG. 5 depicts a side view of a lifting rail 1, as it can be used in the method according to the invention for producing the device 1,5 according to the invention.

FIG. 5 a depicts the vertical section through the lifting rail 1 of FIG. 5 along the section line A-B.

The lifting rail 1 of FIG. 5 corresponded in its features to the lifting rail 1 of FIG. 1, with the substantial difference that instead of the through-hole 2 in the stem surface 3, the outer edge 3.4 had the cutout 7. The connection to a drive device, for example, a lifting device, was able to engage in this cutout 7.

Figure 6:
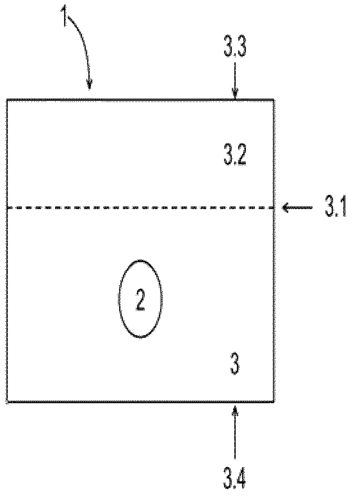
FIG. 6 a side view of the lifting rail 1.
Figure 6A:
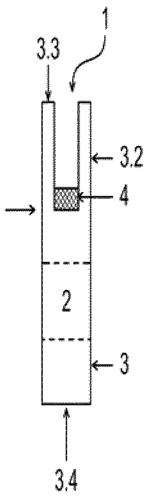
FIG. 6*a* a vertical section through the lifting rail 1.

FIGS. 6 and 6*a*

FIG. 6 depicts a side view of a lifting rail 1, as it can be used in the method according to the invention for producing the device 1,5 according to the invention.

FIG. 6 a depicts the vertical section through the lifting rail 1 of FIG. 6.

The lifting rail 1 of the FIG. 6 corresponded in its features to the lifting rail 1 of FIG. 1, with the substantial difference that its stem surface 3 and the enclosing region 3.2 formed a planar surface. This is illustrated again by FIG. 6*a*, which shows that the vertical section does not have a tuning-fork-shaped configuration.

The invention claimed is:

1. A device, comprising:

a lifting rail that is adhesively bonded to a pane, wherein the lifting rail comprises i) a tuning-fork-shaped vertical section that comprises an enclosing region having two mutually opposite open ends configured to bilaterally enclosing an edge of the pane;

ii) a stem surface;

iii) a region of bifurcation where the stem surface transitions into enclosing region; and iv) an outer edge wherein a through-hole or a cutout is arranged, wherein the lifting rail comprises an adhesive strip with two mutually opposite deformed regions, and wherein the adhesive strip v) partially covers the stem surface so that the through-hole or the cutout remain exposed, vi) covers the enclosing region and the two mutually opposite open ends so that the adhesive strip is deformed by the edge of the pane in two mutually opposite regions of the adhesive strip, and vii) the pane is bilaterally fixed in the enclosing region by means of an adhesive.

2. The device according to claim 1, wherein the adhesive strip completely encircles the stem surface, the enclosing region, and the region of bifurcation.

3. The device according to claim 1, wherein the adhesive strip covers the enclosing region so that the regions adjacent upper edges of the lifting rail remain uncovered.

4. The device according to claim 1, wherein the adhesive strip is one of: a) transparent, b) opaque, and c) a combination of transparent and opaque in different subregions of the adhesive strip.

5. The device according to claim 1, wherein the adhesive covers the pane on both sides up to an upper edge of the lifting rail.

6. The device according to claim 1, wherein the adhesive comprises: a) a polymerization adhesive, b) a polycondensation adhesive, and c) a polyaddition adhesive.

7. The device according to claim 1, wherein a bottom in an interior of the enclosing region in the region of bifurcation is adapted to a contour of the edge of the pane.

8. A method for producing a device, the method comprising:

(1) providing a lifting rail, the lifting rail including 1a) a fork-shaped vertical section that comprises an enclosing region having two mutually opposite open ends configured to bilaterally enclosing an edge of a pane, 1b) a stem surface with a through-hole or a cutout on an outer edge of the stem surface, and 1c) a region of bifurcation where the stem surface transitions into the enclosing region;

(2) introducing an adhesive, into an interior of the enclosing region in the region of bifurcation, in an amount so that after insertion of the pane, the adhesive reaches, both sides of an upper edge of the enclosing region;

(3) adhesively mounting an adhesive strip on the lifting rail so that the adhesive strip 3a) partially covers the stem surface so that the through-hole or the cutout remain exposed, and 3b) covers the enclosing region and the two mutually opposite open ends so that the adhesive strip is deformed by the edge of the pane, upon insertion of the pane, in two mutually opposite regions of the adhesive strip;

(4) inserting the edge of the pane into the interior of the enclosing region, so that the two mutually opposite regions of the adhesive strip are deformed; and (5) curing the adhesive.

9. A method for avoiding pressed-out adhesive masses during production, the method comprising:

(1) providing a lifting rail, the lifting rail including 1a) a fork-shaped vertical section that comprises an enclosing region having two mutually opposite open ends configured to bilaterally enclosing an edge of a pane, 1b) a stem surface with a through-hole or a cutout on an outer edge of the stem surface, and 1c) a region of bifurcation where the stem surface transitions into the enclosing region;

(2) introducing an adhesive, into an interior of the enclosing region in the region of bifurcation, in an amount so that after insertion of the pane, the adhesive reaches an upper edge of the enclosing region;

(3) adhesively mounting an adhesive strip on the lifting rail so that the adhesive strip 3a) partially covers the stem surface so that the through-hole or the cutout remain exposed, and 3b) covers the enclosing region and the two mutually opposite open ends so that the adhesive strip is deformed by the edge of the insertion pane, upon insertion of the pane, in two mutually opposite regions of the adhesive strip;

(4) inserting the edge of the pane into the interior of the enclosing region so that the two mutually opposite regions of the adhesive strip are deformed;

(5) peeling off the adhesive strip along with excess adhesive that flowed out laterally from the enclosing region; and (6) curing the remaining adhesive.

* * * * *